United States Patent
Bardahl et al.

[11] 3,895,285
[45] July 15, 1975

[54] BUS BAR ARRANGEMENT FOR A HIGH-POWERED CONVERTER

[75] Inventors: Nils Bardahl, Uttenreuth; Hans Dorn, Erlangen; Friedrich Scherbaum, Erlangen; Hans-Werner Walter, Erlangen, all of Germany

[73] Assignee: Siemens Aktiengesellschaft, Munich, Germany

[22] Filed: Apr. 5, 1974

[21] Appl. No.: 458,408

[30] Foreign Application Priority Data
Apr. 5, 1973  Germany............................ 2317117

[52] U.S. Cl................................ 321/8 C; 317/100
[51] Int. Cl............................................. H02m 7/06
[58] Field of Search............. 321/8 R, 8 C; 317/100

[56] References Cited
UNITED STATES PATENTS
3,460,022  8/1969  Riley................................ 321/8 R
3,590,359  6/1971  Bossi et al........................ 321/8 R FOREIGN PATENTS OR APPLICATIONS
1,638,565  12/1970  Germany............................ 321/8 R
1,464,267  5/1969  Germany............................ 321/8 R
1,263,165  3/1968  Germany............................ 321/8 R Primary Examiner—William H. Beha, Jr.
Attorney, Agent, or Firm—Kenyon & Kenyon Reilly Carr & Chapin

[57] ABSTRACT

A high-power converter of the type where converter rectifiers and fuses are mounted on bus bars in which at least a portion of the bus bar structure is attached in a self-supporting manner on a base frame through at least one insulating spacer, the bus bar thus forming a frame for the complete converter structure including necessary enclosures thereby making it possible to eliminate otherwise customary, relatively expensive frame structures used in converter arrangements.

12 Claims, 7 Drawing Figures

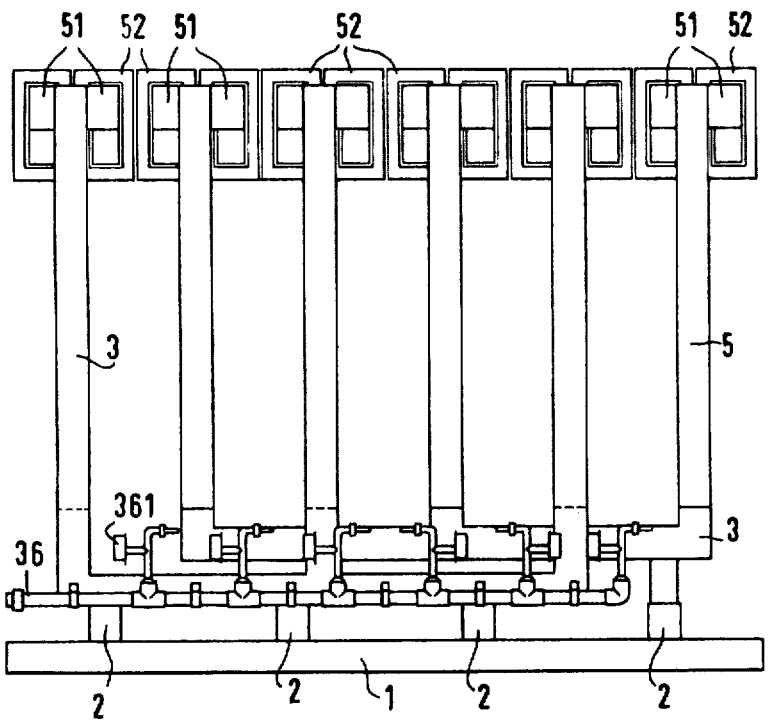
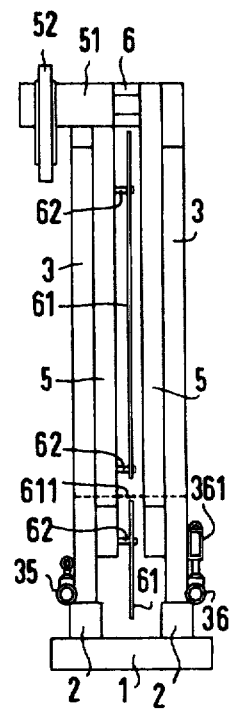
Fig.2                  Fig.4
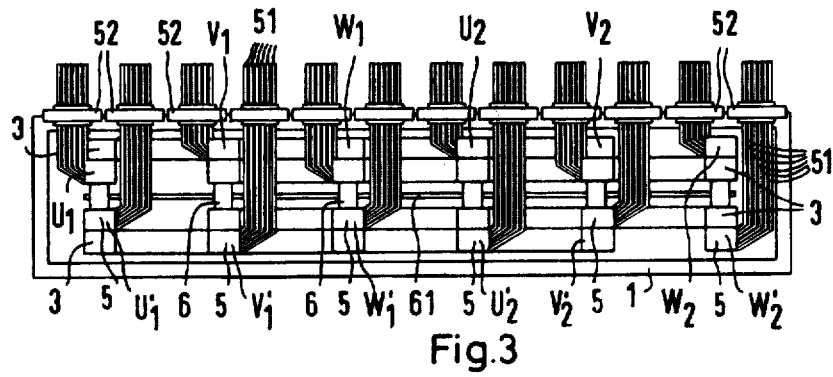
Fig.3

3,895,285

IMPROVED BUS BAR ARRANGEMENT FOR A HIGH-POWERED CONVERTER

BACKGROUND OF THE INVENTION

This invention relates to high-power converters in general, and more particularly to an improved converter arrangement which permits eliminating a large portion of the frame structure, conventionally used in such converters.

Various high-power converters have been developed. Examples of such are those disclosed in Siemens Zeitschrift Vol 44, (1970) No. 6, p. 345, on FIG. 3 or from Brown-Boveri-Mitteil-Unger 11-1971, p. 503 on FIG. 3. A typical use for installation such as these is in rectifier installations in the chemical industry. As is evident from the above cited references, these rectifier installations are usually designed in the form of cabinet units. The converter rectifiers and fuses are mounted on bus bars and the bus bars supported by support frames. If required, doors and wall sections are also fastened to the same support frame. Another type of rectifier used in the chemical industry is described in BBC-Nachrichten, Nov. 1966, p. 611. This rectifier as shown on FIG. 5 is also built on a frame. However, as compared with the previously cited references in which the bus bars, fuses and rectifiers are arranged in the center of the frame structure, the frame structure supporting the rectifier in this converter is in the center between the AC and DC bus bar. In this arrangement, the bus bars are also supported by the frame structure.

In chemical rectifier installations, there has been a steadily increasing demand for rectifiers of higher and higher DC output currents. For example, the required current in installations presently used for chlorine electrolysis can be as high as 550 kA. This increase in current requirements has led to the development of larger converter units in which the phase currents on the AC side reach 20 kA rms and more. These large AC currents cause considerable heating of the support frames due to eddy current effects. Even though the known support frames are joined together at several points by layers of insulation in order to avoid major circulating currents, the prevention of major heating can be accomplished only at relatively high cost when operating at these large currents. At the same time, because of these various requirements the support frames become relatively expensive.

Thus, it can be seen that there is a need for an improved design in heavy duty converters of this nature in which the heating in the frames can be avoided to the largest extend possible and in which at the same time a reduction in the cost of the installation may be achieved.

SUMMARY OF THE INVENTION

The present invention solves this problem by employing the bus bars themselves as support elements. By using the bus bars as self supporting elements, a considerable cost reduction of the rectifier installation is achieved since the usual relatively expensive and support structures are eliminated. Furthermore, the approach is technically superior since the heating found in the prior art support frames cannot possibly occur since no support frames are installed. In the embodiments illustrated, only the DC bus bars are attached in the self supporting manner to the base frame through at least one insulation spacer. Such an arrangement has been found to be advantageous. The AC bus bars are then attached in an electrically separated manner using insulating layers to the DC bus bars alone. In the disclosed embodiment, the DC bus bars are arranged along the long sides of a rectangular base frame through at least one insulating spacer such that on each long side of the base frame only bus bars of one polarity are arranged. As is illustrated, it is preferred that a bulkhead partition which is fastened to the bars of one long side is installed between the DC bus bars of opposite polarity. Furthermore, as shown, insulating supports may be arranged between bus bars of opposite polarity. Transversely to the longitudinal axis of the DC bus bars of one polarity, an insulating bar may also be attached thereto. Through this design of the heavy duty converter, a particularly advantageous structure is obtained. Since the DC and AC bus bars ae placed immediately next to each other, corresponding fuses and converter elements can be mounted directly next to each other in the bus bars and connected through power cables. The current path between the AC and DC sides is shortened to an optimum extent. Through the separation of bus bars of different polarity on opposite long sides of the base frame and because of the bulkhead partition between these DC bus bars of opposite polarity, the danger of short circuits on the DC side within the converter installation is largely eliminated. Furthermore, support posts arranged between the bus bars create well defined leakage current configurations.

As illustrated, the present invention provides an advantageous arrangement for attaching enclosure surfaces. These are attached at an insulating bar installed transversely to the longitudinal axis of the DC bus bars. This permits enclosure surfaces for protection of the installation or protection of personnel outside the installation which are attached to the insulating bars. With this arrangement, it is especially advantageous that the self supporting bus bars themselves support the enclosure surfaces requiring no separate support points within the installation.

In the illustrated embodiment, several DC bus bars of one polarity are combined into a common bus bar of an E-shaped design. Each of the lug-shaped ends of the E-shaped bus bar are associated with one of the three phases of the three-phase AC system. The lug-shaped ends are used for the attachment of converter elements or fuses along with serving for attachment of the corresponding AC bus bars thereto. Through this design a largely uniform current distribution on the respective DC side is achieved. In addition, the arrangement permits a particularly simple design of the double-Y circuit with suction choke which is commonly used in chemical rectifier installations or a three-phase bridge circuit.

A further advantageous embodiment of a heavy duty converter of this nature includes cooling fins on the DC bus bars on one side over the full length. In this arrangement, the AC bus bars are fastened to the DC bus bars approximately at right angles to the latter in an insulated manner. As part of the support structure, a beam with a T-cross section is placed with its stem portion on insulating spacers supported on the base. Bus bars are attached on one side of the cross portion of the T, i.e., the bus bars for conducting current out of the converter arrangement. On the other side of the T, the converter DC bus bars are attached with cooling fins omitted in the area of attachment. In this arrangement, the cooling air is conducted over the cooling fins through an air shaft having a tapered cross section from the point where the air enters in the direction of the exit point. This arrangement makes it possible to cool such a heavy duty converter with air and through the tapered design of the air shaft insures that cool air also gets to the end of the bus bar remote from the entrance point, even though cooling air is only supplied from a single point.

BRIEF DESCRIPTION OF DRAWINGS

FIG. 2 is an elevation view of a water cooled converter according to the present invention.

FIG. 3 is a plan view of the converter of FIG. 2.

FIG. 4 is an end view of the converter of FIG. 2.

DETAILED DESCRIPTION OF THE PREFERRED EMBODIMENT

Figure 1:
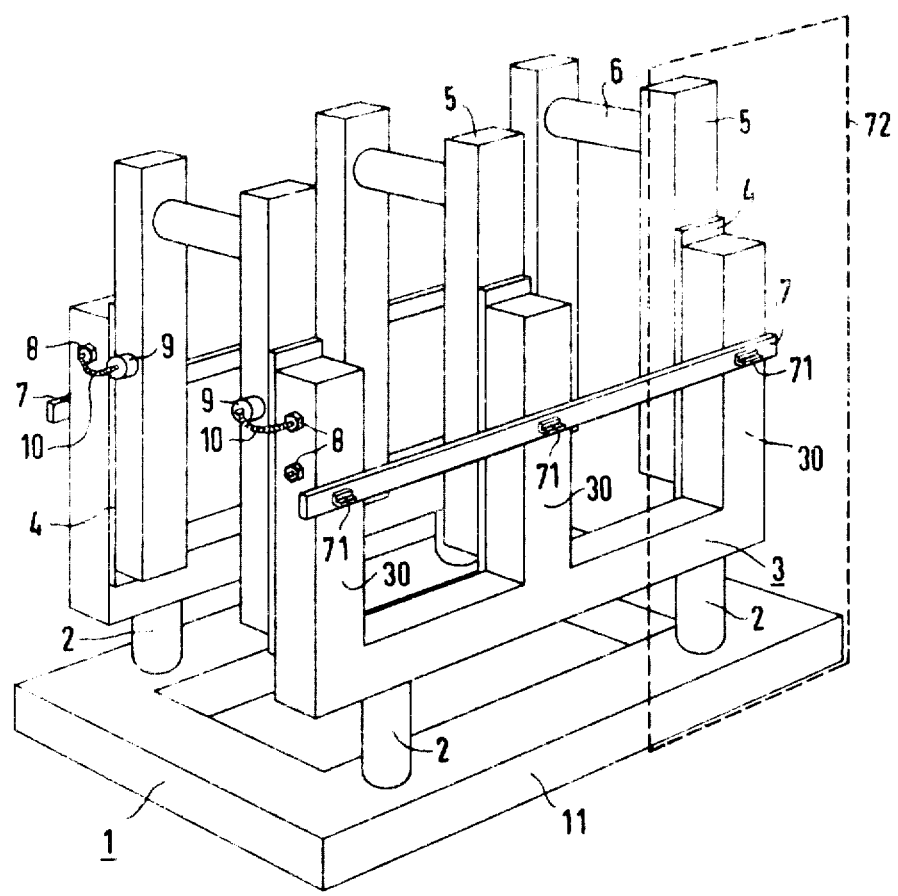
FIG. 1 is a perspective view of a converter installation according to the present invention.

FIG. 1 is a perspective diagrammatic sketch of a converter according to the present invention. In this embodiment, two DC bus bars 3 each of which are E-shaped are supported on a base 1 through insulating spacers 2. The DC bus bars, typically made of extruded aluminum form the frame of the complete converter structure including any necessary enclosures, such as an enclosure 72. Typically enclosure such as enclosure 72 are made of a transparent insulating material. The lug-shaped ends of the E-shaped bars 3 have attached thereto converter rectifiers 8 and fuses 9 along with AC bus bars 5. The AC bus bars 5 are not attached to the frame but only to the bus bars 3 through insulating layers 4. As illustrated, the DC bus bars are attached at the long sides 11 of the rectangular base frame 1 such that bars of only one polarity are arranged on each long side of the base range. In order to provide support against the magnetic forces which will develop between the bars 3, insulating supports 6 are attached between bus bars of opposite polarity. An insulating bar 7 is attached transversely to the longitudinal axis at a DC bus bar 3 of each polarity. The insulating bar 7 contains fastening elements 71 used for attaching the enclosure parts 72 which then serve for protecting personnel from accidently contacting the bus bars.

FIG. 2 to 4 illustrate an embodiment of the converter arrangement of FIG. 3 in a liquid cooled converter design. This design permits a simple implementation of a double three phase bridge circuit or a double Y-circuit with a suction choke. Illustrated on the elevation view of FIG. 2 are the E-shaped DC bus bars 3. As shown, two E-shaped DC bus bars are provided supported on a base 1 through insulating spacers 2. As is more clearly shown by FIGS. 3 and 4, two E-shaped DC bus bars 3 are installed on each side of the converter arrangement with all bus bars on one side being of the same polarity. In this arrangement, the two E-shaped bars are associated with the two respective bridges or two Y-circuits. The two DC bus bars 3 on each side are laterally and elevationally displaced. As may be more clearly seen from FIGS. 4 and 5, the DC bus bar 3 on the left and which is somewhat lower, has AC bus bars attached on its backside as indicated by the dashed lines and the bus bar 3 to the right, which is somewhat higher, has AC bus bars 5 on the front side. AC feeds 51 are attached to the AC bus bars 5 as is clearly illustrated on FIG. 3. These leads are in the form of a plurality of flat strips and each lead has installed therein a reverse current alarm transformer 52. Liquid cooling of the bus bar arrangement takes place with a supply of water being provided at a water inlet 35 from which it flows through four tubular ducts formed in the individual bus bars during their manufacture by an extrusion process. The cooling water is led in a well known manner through the bus bars by feeding the coolant in through two ducts of the bus bar at the lower end, conducting it through the bus bar, deflecting it at the upper end into two opposite tubes and returning it at the opposite side of the bus bar through the other two ducts to the base of the bus bar. In assemblying the individual bus bar sections to form the common bus bar for one polarity in the form of an E, the coolant feedthroughs are connected with each other in such a way that it is possible to feed, for example, from the left-hand side into the bus bar 3 of FIG. 2 with the cooling liquid flowing successively through the lug-shaped ends of the E until it reaches the water outlet line 36 at the right hand end of the common bus bar. Attached from the outlet side are flow meters 361 which permit the localization of leaks within the converter installation.

FIG. 3 showing a plan view of the arrangement of FIG. 2 is particularly helpful in understanding the interleaving of the individual bus bars in the self-supporting structure. In this figure, the AC bus bars 5 are designated with the phase to which they are coupled with the phases U1, V1, W1 designating one side of a first three phase Y or bridge U1', V1' and W1' designating the other side of this first three phase connection. U2 through W2 and U2' through W2' indicate the other three phase connections. This figure also illustrates the manner in which the AC bus bars are attached in one case on the inside of the DC bus bar 3 and in the other case on the outside of the DC bus bars 3. The insulating layers 4 illustrated on FIG. 1 are not shown in this figure in the interest of greater clarity. However, the insulating supports 6 are shown, which supports are attached between the DC bus bars of opposite polarity. Also shown between the DC bus bars of opposite polarity are bulkhead partitions 61. The design of the AC feeds 51 in the form of several ribbons disposed parallel to each other as shown on FIG. 3 insures that the considerable length changes which occur due to changing current demands and the temperature rise connected therewith can be compensated for. Also shown on FIG. 3 are the reverse current alarm transformers 52.

FIG. 4 showing an end view of the arrangement shows particularly clearly the bulkhead partitions 61 between the DC bus bars 3 of opposite polarity. Shown are fastening elements 62 supporting the partitions 61 and attached only to bus bars on one side of the base frame. Through this type of arrangement, i.e., fastening to only one side, additional leakage paths between the DC sides other than those through the support posts 6 are prevented. Above the connecting portions of the DC bus bars there is arranged between the bulkhead partitions 61 an intercept screen 611 which prevents any object dropping from above from short-circuiting the DC sides of opposite polarity. This figure also clearly illustrates the base frame, the insulating support posts for the DC bus bars 3, the attachment of the AC bus bars 5, the insulating layer between the AC and DC bus bars not being shown hereon, the water inlet 35 and water outlet 36 with the flow meters 361 attached thereto along with the AC feeds 51 and the reverse current alarm transformers 52 suspended therefrom.

Figure 5:
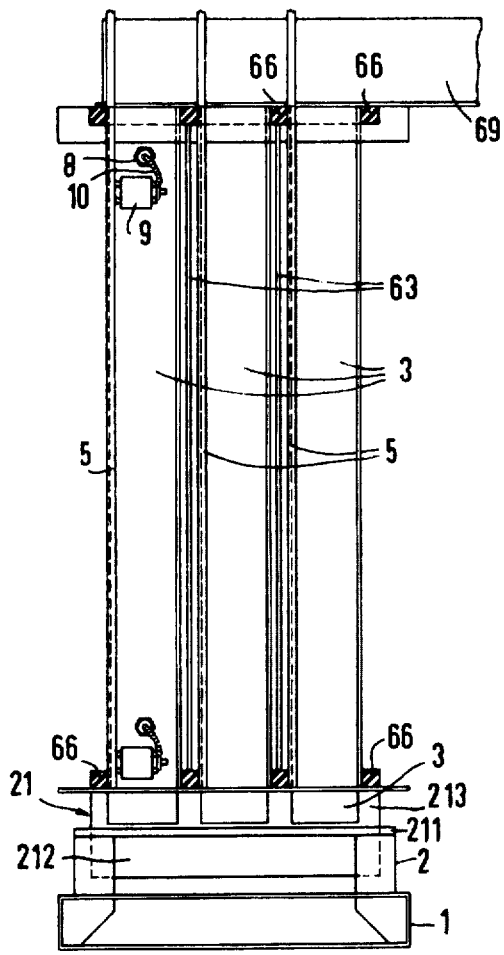
FIG. 5 is an elevation view of an air cooled converter according to the present invention.
Figure 7:
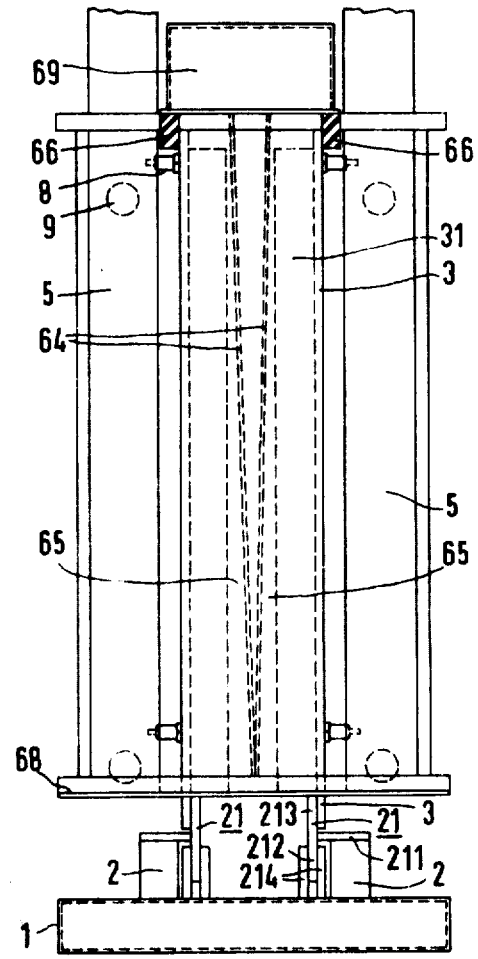
FIG. 7 is an end view of the converter of FIG. 5.
Figure 6:
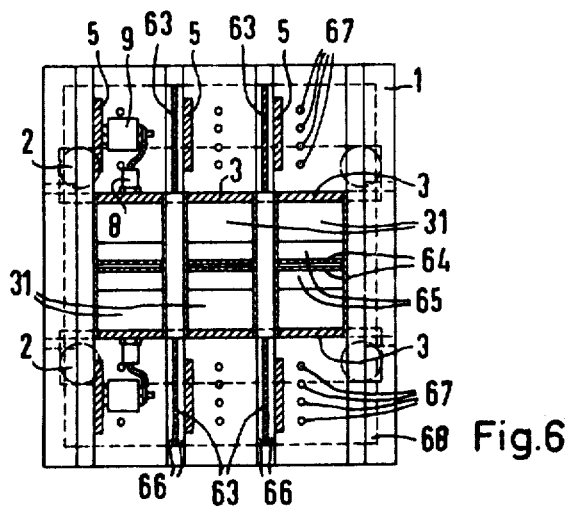
FIG. 6 is a plan view partially in cross section of the converter of FIG. 5.

FIGS. 5 to 7 illustrate an air cooled heavy duty converter. The bus bars 3 and 5 are supported on a T-beam 21 which is supported on a base frame 1 through insulating spacers 2. As illustrated, the individual DC bus bars 3 as well as the corresponding AC bus bars 5 are separated from each other by insulating plates 63. Also illustrated on this figure is the attachment of the converter elements 8 and fuses 9 in a well known manner at the bus bars. The converter elements and the fuses are connected through a power cable 10. Cooling air is supplied to the bus bars at their lower end near the floor and after it has performed its cooling function, is collected in an air duct 69 at the upper end through which it is led off in well known manner.

FIG. 6 illustrates a plan view of the embodiment of FIG. 5. This view is particularly helpful in seeing the structural arrangement of the bus bars relative to each other as well as the arrangement of the cooling air shafts. In the center of a nearly square base frame are two DC bus bars 3 standing vertically on the base frame in a manner to be more fully described below. As with the previous embodiments, the bus bars of one polarity are on one side and the bus bars of the opposite polarity on the other side with the two DC bus bars separated from each other by cooling air shafts 65. Arranged along the sides of each of the bus bars 3 are cooling fins 31. The air shafts 65 are formed by plates of insulating material 64 and act to lead the cooling air past the cooling fins 31. The AC bus bars are fastened to DC bus bars 3 at right angles thereto using fastening elements 66. The AC bus bars of different phases are protected from each other by plates 63 of insulating material to avoid short circuits. This figure also illustrates the geometrical arrangement of the converter elements 8, the fuses 9 and the power cables 10. Since the AC bus bars must also be cooled by air, air passage holes 67 are provided in a cover plate 68 on the bottom side. The distribution of the cooling air to the DC bus bars through the cooling air shafts 65 and to the AC bus bars through the holes 67 has the effect that the cooling air is conducted essentially past the DC bus bars as desired. At the same time, cooling of the AC bus bars occurs although to a substantially lesser degree.

FIG. 7 is an end view of the converter arrangement of FIG. 5. The attachment of the DC bus bars 3 as a self supporting frame for the complete converter structure is particularly well shown. A T-beam 21 lying on its side is placed with its stem 211 on insulating spacers 2 which connect it to and separate it from a base frame 1. In addition to its support function, the T-beam also serves as a DC bus bar. The crosspiece of the T-beam is made up of an upper portion 213 and a lower portion 212. To the lower portion 212 bus bars 214 are attached through which current may be taken off from the DC side. On the upper portion of the cross-piece designated 213, the DC bus bars 3 are attached. At the area of attachment, the cooling fins 31 are omitted from the bus bar. In the manner described above in connection with the other embodiments, the DC bus bars 3 support the complete converter structure. The arrangement of the cooling air shafts 65 which conduct the cooling air to the cooling fins 31 is also shown on this figure. As illustrated, the air shafts 65 are tapered from the entrance point of the cooling air towards the exit point. The cooling air is collected in the air duct 69 and is discharged as described above. Also shown on this figure are the AC bus bars 5 which are placed at right angles to the DC bus bars 3 and the converter elements 8 and fuses 9.

Thus, an improved heavy duty converter arrangement in which the bus bars are attached in a self supporting base frame providing the frame for the complete converter and its enclosure has been shown. Although specific embodiments have been illustrated and described, it will be obvious to those skilled in the art that various modifications may be made without departing from the spirit of the invention which is intended to be limited solely by the appended claims.

What is claimed is:

1. A high power converter of the type wherein converter elements and fuses are mounted on bus bars comprising:
   a. a rectangular base frame;
   b. a positive DC bus bar;
   c. a negative DC bus bar;
   e. first means for insulating attaching said positive DC bus bar in a self supporting manner to one of the long sides of said base frame;
   f. second means for insulating attaching said negative DC bus bar in a self supporting manner to the other long side of said base frame, said DC bus bars forming a supporting frame work for the complete converter structure including enclosures;
   g. a plurality of AC bus bars fastened only to said DC bus bars;
   h. insulating layers separating each of said AC bus bars from said DC bus bars to which they are attached.

2. A high-power converter according to claim 1 and further including at least one bulkhead partition arranged between the bus bars of opposite polarity, said bulkhead partition being fastened to the bus bars on only one side.

3. A heavy duty converter according to claim 2 and further including insulating supports attached between the DC bus bars of opposite polarity.

4. A heavy duty converter according to claim 3 and further including an insulating bar attached to said DC bus bars of one polarity transversely to the longitudinal axis of said DC bus bars.

5. A heavy duty converter according to claim 4 and further including at least one enclosure surface attached to said insulating bar.

6. A heavy duty converter according to claim 5 wherein a plurality of DC bus bars of one polarity are combined into a common bus bar.

7. A heavy duty converter according to claim 6 wherein said bus bar is of an E-shaped design.

8. A heavy duty converter according to claim 7 wherein the three lug-shaped ends of each E-shaped DC bus bar are each associated with one of the three phases of a three-phase system with the AC bus bar associated with a corresponding phase attached to said lug-shaped end and further including converter elements and fuses attached to each of said lug-shaped ends.

9. A heavy duty converter according to claim 8 and further including cooling fins on one side of each bus bar to which a converter element is mounted.

10. A heavy duty converter according to claim 9 wherein said AC bus bars are fastened to said DC bus bars approximately at right angles thereto and further including means insulating said AC bus bars from said DC bus bars.

11. A heavy duty converter according to claim 10 wherein each of said DC bus bars is fastened to one side of the crosspiece of a beam having a T cross section, the stem of said T being attached by said insulating spacers to said base and further including bus bars for taking off current fastened to the other side of the crosspiece of said T and wherein said DC bus bar is free of cooling fins in the attachment area.

12. A heavy duty converter according to claim 11 and further including means arranged in cooperation with said DC bus bars to form a plurality of air shafts.

* * * * *